F. C. CRAW.
AUTOMOBILE THEFT ALARM.
APPLICATION FILED JULY 22, 1921.
1,434,099. Patented Oct. 31, 1922.
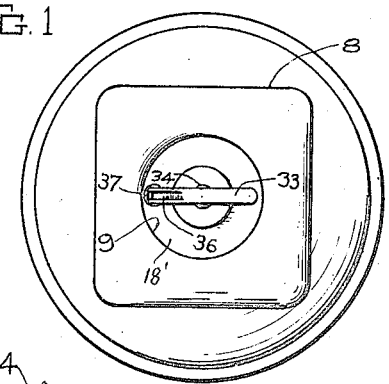
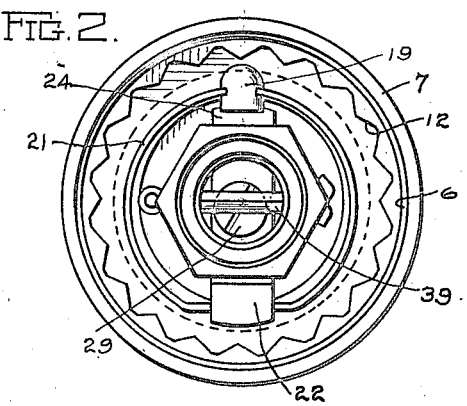
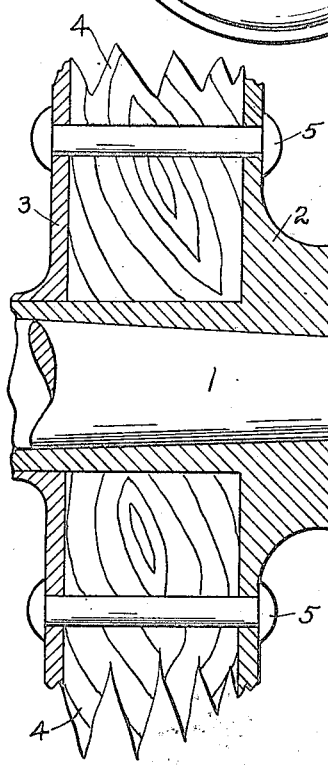
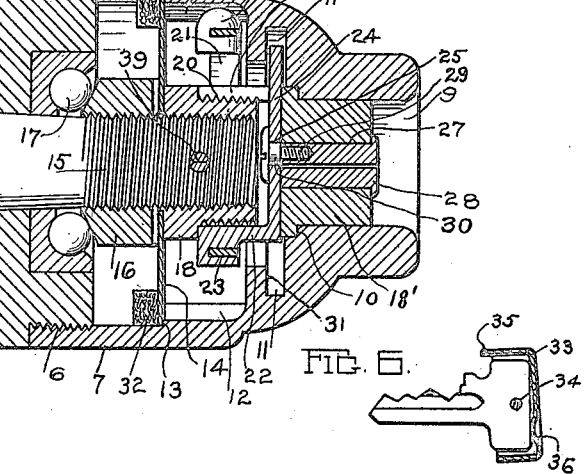
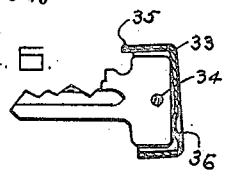
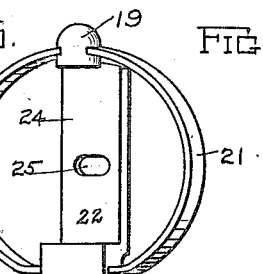
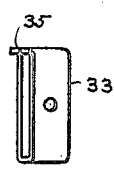
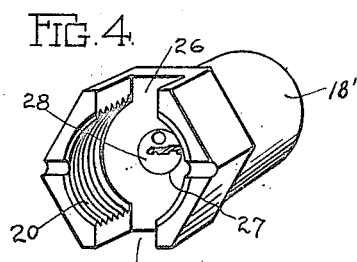
INVENTOR
Frank C. Craw
BY
Wooster & Davis
ATTORNEYS Patented Oct. 31, 1922.

1,434,099

UNITED STATES PATENT OFFICE.

FRANK C. CRAW, OF SOUTH NORWALK, CONNECTICUT.

AUTOMOBILE THEFT ALARM.

Application filed July 22, 1921. Serial No. 486,794.

*To all whom it may concern:*

Be it known that I, FRANK C. CRAW, a citizen of the United States, residing at South Norwalk, county of Fairfield, State of Connecticut, have invented an Improvement in Automobile Theft Alarms, of which the following is a specification.

This invention relates to automobile theft alarms of the type which are adapted to be applied to a wheel of an automobile and to sound an audible alarm on movement of the vehicle when the alarm is set.

It is an object of the invention to provide a device of this type which may be quckly and easily applied to any car desired without changing the structure thereof.

It is also an object of the invention to provide an alarm of this type which may be applied in place of the usual cap on the outer end of the hub of a front wheel.

It is a further object of the invention to provide a device which will be locked against removal from the hub when the alarm is set.

It is a still further object of the invention to provide a device of this type which comprises very few parts and, therefore, will be cheap to manufacture and will not be liable to get out of order.

With these and other objects in view, the preferred construction comprises a support which may be screwed onto the end of the axle with a yieldingly mounted clapper carried by said support, a cap or casing embracing said support and clapper and adapted to be secured to the end of the hub in place of the usual cap and provided on the inner wall thereof with a plurality of ribs adapted to coact with the clapper to sound an alarm, a locking means movable with the clapper and adapted to prevent the removal of the cap when the alarm is set, and means controlled by a key for moving the clapper to and from cooperative relation with the ribs.

Referring to the accompanying drawings,

Fig. 1 is an end view of the free end of the cap with the key in the lock.

Fig. 2 is an elevation looking from the inner end of the cap removed.

Fig. 3 is a central longitudinal section of the cap and a portion of the hub of the wheel.

Fig. 4 is a perspective view of part of the support for the clapper and locking element.

Fig. 5 is a detailed perspective view of the clapper and locking element removed.

Fig. 6 is an elevation of the key showing a retaining means therefor in section, and Fig. 7 is a perspective of the retaining means for the key.

Reference numeral 1 indicates a stationary front axle of an automobile and 2, the outer hub plate between which and the inner plate 3, the inner ends of spokes 4 are clamped by suitable means such as bolts 5. In the usual constructions, the outer end of the hub plate 2 is threaded at 6 to receive a distinctive cap which covers and protects the nut on the end of the axle for retaining the wheel thereon. In applying my alarm, this cap is removed and my device substituted therefor and, if desired, may be formed with practically the same external appearance as the old cap.

This device comprises a cap or casing 7 internally threaded at its open inner end to fit the screw threads 6 on the hub 2, the outer free end of this casing being formed for the application of a suitable wrench to facilitate the turning of the cap to apply it to the hub. In the present instance, it is shown as square at 8, but obviously it may be hexagonal or other shape, as desired. The cap is hollow, providing a chamber in which is placed the alarm mechanism, and a cylindrical opening 9 leads from this chamber to the exterior of the cap through the free end thereof. The inner end of this opening is formed with an annular shoulder at 10. Adjacent this shoulder, the cap is provided with an annular locking groove or channel 11 opening to the chamber within the cap. Inwardly of this groove or channel, the chamber is enlarged and the cap is formed on the inner walls thereof with a series of projections extending into the chamber preferably in the form of ribs 12. These ribs, as shown, preferably extend substantially one half the length of the chamber, ending adjacent a small shoulder 13 which acts as a seat for a thin plate 14, preferably of metal.

The end of the axle 1 is threaded at 15 for a retaining nut and cone 16, as is well known, the usual roller or ball bearings 17 being employed. In applying my device, the retaining nut is removed and the support 18 for the clapper or striker 19 applied in place thereof, the flat disk 14 being applied between this support and the cone 16 for a purpose presently to be described.

In the form of device shown, the support 18 is made up of two parts connected by means of threads 20 but this support may, if desired, be formed of a single element. It is preferred to construct this of two pieces, as shown, because the axles 1 for different machines are of various sizes and have screw threads of various pitches and the inner sections for the support 18 may be provided with standard outer threads 20 but varying inner threads to fit the various axles. This arrangement allows for the use of the same lock and outer element of the support 18 for various axles. It will be obvious however, that if a number of alarms are made up for a given machine, this expedient will be unnecessary and the support 18 may be formed of a single element internally threaded to fit the axle of this particular machine. The outer element of support 18 is indicated by reference character 18′.

The clapper 19 preferably comprises a cylindrical element provided with a rounded outer end and is secured by any suitable means upon a flat ring spring 21, this spring being secured at a point diametrically opposite the clapper 19 to a sliding lock element 22. This element, as shown in Figs. 3 and 5, is substantially L-shaped, the springs 21 being secured to the horizontal leg thereof preferably by inserting it in a slot 23 formed therein and soldering. The vertical leg 24 is flat, as shown, and is provided substantially centrally thereof with a transversely extending slot 25. This lock element is mounted to slide in a transverse opening through the support 18 in the construction shown, formed by recessing the inner end of the outer element of the support at 26, but when the element 18 is made in one piece it will be a rectangular transverse opening thereto. The outer end of support 18 is provided with a cylindrical opening 27 in which is mounted the cylindrical barrel 28 of an ordinary Yale lock, this barrel being mounted to turn in this opening and carries the usual tumblers employed in this type of lock. Eccentrically mounted on the inner end of this barrel is a shouldered screw 29 provided with a bearing 30 adapted to fit in the slot 25 in the vertical leg 24 of the locking element 22, the free end of this leg 24 being mounted in alinement with the annular groove 11, and is of such a length that it may, under certain conditions, extend into the groove 11 for the purpose of locking the cap 7 to the hub. This is accomplished as follows:

As the screw 29 is eccentrically mounted on the barrel 28, rotation of this barrel will move the locking element 22 transversely of the support 18 within the opening 26, at the same time moving the spring 21 and the clapper 19 carried thereby, to and from engagement with the ribs 12 on the inner wall of the cap. The parts are so proportioned that when the clapper 19 is removed from the path of movement of the ribs 12, the free end of the leg 24 will be removed from the groove 11 and by merely turning the cap 7 it may be unscrewed from the hub 2, if desired. If, from this position, the barrel 28 is given a half revolution, the screw 29 will slide the end of the leg 24 into the groove 11 behind the annular shoulder 21 and at the same time move the clapper 19 into the path of movement of the ribs 12. It will thus be seen the alarm is now set and any turning of the cap 7 will cause the ribs 12 to coact with the clapper 19 to sound the alarm, and the faster this movement or the greater speed of the car, the greater will be the alarm sounded. It will also be apparent that, as the free end of the leg 24 is within the groove 11, the cap 7 cannot be unscrewed from the hub 2 because of the shoulder 31. It will, therefore, be obvious that when the alarm is set it cannot be rendered ineffective by removal thereof from the hub of the wheel.

The circular plate 14 is used to prevent the oil from the bearing passing into the alarm device, a suitable packing 32 being employed at the outer edge of this plate.

The screw 29 is so placed on the barrel 28 of the lock that the key can be removed only when the alarm is set and the cap locked to the hub, as shown in Fig. 3. As previously described, the turning of the barrel 28 through a half revolution unlocks the cap and moves the clapper 19 away from the path of the ribs 12. When in this position the tumblers in the lock prevent removal of the key and as this is the running position, it is desirable to provide means for preventing the jar incident to said running from rotating the key and barrel and setting the alarm and lock. In Figs. 6 and 7 I have illustrated an effective means for doing this. A cap 33 substantially rectangular in shape, open at one side to fit over the outer end of the key, is provided, and a pin 34 passes through the walls of the cap and the key to secure this cap to the key and provide a pivot therefor. One end of the cap is provided with a projection 35 and, on the opposite side of the pin 34 from this projection, the cap is lanced and bent inwardly to form a spring 36 bearing against the end of the key. This spring tends to rock the cap on its pivot and move the projection 35 toward the inner end of the key. A recess 37 is provided in the exposed end of the outer member of the support 18 and is so located as to receive the projection 35 when the alarm is not set and the cap is unlocked. When it is desired to set the alarm and lock the cap, obviously, all that is necessary is to press on the end of the cap 33 provided with the spring 36 to remove the projection 35 from the recess 37. The key may then be turned to set the alarm and lock the cap and may be then removed from the lock.

Suitable means may be provided to secure the support 18 to prevent turning thereof on the axle under the action of the jar during operation such as a cotter pin 39.

It will be obvious from an inspection of the drawings that the device is very simple in construction requiring few parts and also occupies a comparatively small space so that it may be applied to the end of the hub of an automobile in place of the usual cap without materially increasing the projection of the cap from the wheel. It will also be apparent that the device is comparatively cheap to manufacture and not liable to get out of order and, therefore, is reliable in operation.

As the wheel is not locked against turning, the car may be removed from a garage in case of fire when the alarm is set, but there is no danger of the car being stolen, or used by unauthorized persons.

Having thus set forth the nature of my invention, what I claim is:

1. In a device of the class described, a support adapted to be secured to the end of an axle, a cap adapted to be secured to the hub of a wheel mounted to rotate on said axle and to enclose the support, said cap being provided with a series of ribs, a clapper carried by said support, and means for moving the clapper to and from the path of movement of the ribs.

2. In a device of the character described, an axle, a hub mounted to rotate on said axle, a supporting element carried by the axle, a casing element carried by the hub and enclosing said supporting element, projections carried by one of said elements and a clapper carried by the other element and adapted to coact with the projections to sound an alarm, and means for rendering the alarm inoperative.

3. An alarm for automobiles comprising a support adapted to be secured to the end of an axle, a cap or casing enclosing the support and adapted to be secured to the hub of a wheel mounted to rotate on said axle and provided with a series of projections, a striker carried by said support and adapted to coact with the projections to sound an alarm, means for rendering the alarm effective and ineffective at will, and means controlled by said latter means for preventing removal of the cap or casing when the alarm is effective.

4. An alarm for automobiles comprising a support adapted to be secured to the end of an axle, a cap adapted to be secured to the hub of a wheel mounted to rotate on said axle and to enclose said support, said cap being provided with a series of ribs on the inner wall thereof, a clapper carried by said support, means for moving the clapper into and from the path of movement of said ribs, and means controlled by said latter means for preventing removal of said cap when the clapper is in position to strike the ribs.

5. An alarm for automobiles comprising a support adapted to be secured to the end of an axle, a cap adapted to be secured to the hub of a wheel mounted to rotate on said axle and to enclose said support, said cap being provided with a series of ribs on the inner wall thereof, a clapper carried by said support and movable transversely thereof to and from a position to strike said ribs, and means accessible from the exterior of the cap for moving said clapper to and from effective position.

6. An alarm for automobiles comprising a support secured to the end of an axle, and provided with a transverse slot, a locking element mounted to slide in said slot, spring carried by said locking element, a clapper element carried by said springs, a cap or casing enclosing said elements and secured to the hub of a wheel mounted to rotate on said axle, said cap being provided with a series of projections on the inner wall thereof in line with said clapper and an annular groove in line with the locking element, a lock including a rotatable barrel carried by the support and accessible from the exterior of the cap, and means carried by said barrel and operating on rotation thereof to shift the clapper to and from engagement with said projections and the locking element to and from engagement with said groove.

7. An alarm for automobiles including a clapper and means cooperating therewith to sound an alarm carried by an axle and a wheel mounted to rotate thereon, means for at will setting the clapper and cooperating means in relative effective or ineffective positions, comprising a lock, a key for controlling the lock, and means to prevent removal of the key when the alarm is not set.

8. An alarm for automobiles including a support adapted to be screwed on the end of an axle, a clapper carried by said support, a cap secured to the hub of a wheel mounted to rotate on said axle and enclosing the support and clapper, means carried by the cap adapted to cooperate with the clapper to sound an alarm, said support comprising two elements, one element being internally threaded to receive the end of the axle and also provided with means for detachably securing it to the other element, and the second element being provided with means for mounting the clapper.

In testimony whereof I affix my signature.

FRANK C. CRAW.